United States Patent [19]

Bitsch et al.

[11] 4,314,303

[45] Feb. 2, 1982

[54] OVERVOLTAGE PROTECTION DEVICE

[76] Inventors: Rainer Bitsch, Hacienda Grande 406, Queretaro, Qro., Mexico; Armin Diessner, Cicerostr. 61, 1000 Berlin 31; Bruno Müller, Hubertusallee 54, 1000 Berlin 33, both of Fed. Rep. of Germany

[21] Appl. No.: 76,582

[22] Filed: Sep. 18, 1979

[30] Foreign Application Priority Data

Sep. 18, 1978 [DE] Fed. Rep. of Germany ....... 2840900

[51] Int. Cl.³ .............................................. H02H 9/06
[52] U.S. Cl. ..................... 361/120; 333/182; 361/56; 361/118
[58] Field of Search ............... 361/56, 91, 110, 111, 361/113, 118, 120, 130; 333/182, 184, 185

[56] References Cited

U.S. PATENT DOCUMENTS

| 3,638,144 | 1/1972 | Denes | 333/182 |
| 3,733,521 | 5/1973 | Kalb | 361/120 X |
| 3,879,691 | 4/1975 | Fritz | 333/182 |

Primary Examiner—Harry E. Moose, Jr.
Attorney, Agent, or Firm—Kenyon & Kenyon

[57] ABSTRACT

An overvoltage protection device for metal-encased, gas-insulated high-voltage lines is disclosed. The device includes a low pass filter which comprises an inductance connected in series with the inner conductor of the high voltage line, and a capacitance connected between the inner conductor and the grounded casing. The inductance and capacitance form the low-pass filter which serves as a trap for high-frequency traveling waves. The invention is especially suited for protection of metal-encased and gas-insulated high-voltage lines and installations in conjunction with a conventional overvoltage arrester.

16 Claims, 2 Drawing Figures

OVERVOLTAGE PROTECTION DEVICE

The present invention relates to an overvoltage protection device for gas-insulated high-voltage lines having an inner conductor enclosed by a metal casing.

A lightning arrester for a conductor enclosed in a grounded metallic enclosure which is filled with gas is disclosed in U.S. Pat. No. 3,733,521. Such overvoltage arresters, which comprise a series connection of spark gaps and voltage-dependent resistors become active when for any reason the voltage at the conductor to be protected exceeds a certain magnitude; they then establish a current path of low resistance to ground. As soon as the voltage is reduced to the value of the socalled extinction voltage, the overvoltage arrester returns to its inactive state in which it provides a very high impedance to ground. Despite the use of overvoltage arresters, the insulation of metal-encased high-voltage lines must be designed for operation at voltage values which are much higher than the highest possible operating voltage, because, on the one hand, the response voltage (i.e., the voltage at which the arrester is activated and the extinction voltage) of the overvoltage arresters cannot be adapted to the highest operating voltage as closely as may be necessary, and because, on the other hand, overvoltage arresters cannot completely prevent the propagation of traveling waves.

SUMMARY OF THE INVENTION

It is an object of the present invention to provide an overvoltage protection device for high-voltage lines having an inner conductor enclosed by a metal casing.

It is another object of the present invention to provide an overvoltage protection device for high-voltage lines having an inner conductor enclosed by a metal casing to which an overvoltage or lightning arrester is connected.

It is further an object of the invention to provide an overvoltage protection device for high-voltage lines having an inner conductor enclosed by a metal casing which are particularly effective for traveling waves having short leading rise times.

According to the invention, an overvoltage protection device is provided which comprises a low-pass filter having an inductance and a capacitance. The low pass filter is disposed in a casing section which is disposed axially of the high-voltage line. Such a low-pass filter has the property of having low resistance to passing energy at a frequency between about 16⅔ and 60 Hz and of thus being practically loss-free. On the other hand, for traveling waves whose frequency is higher by several orders of magnitude, the overvoltage protection device serves as trap. Protection against the back of the traveling waves is provided by an overvoltage arrester which may be used in conjunction with the low pass filter.

According to the invention, the casing section containing the low-pass filter may have flanges for connection of the casing section to adjacent sections of the high-voltage line. The overvoltage protection device is then insertable as needed in a metal-encased high-voltage line as a component.

Alternatively, the casing section of the low-pass filter may be formed by the end of a section of the high-voltage line. Such a casing end section has increased diameter and is provided with a flange for connection to the adjacent casing of the high voltage line or an overvoltage protector or lightning arrester. When needed, the active parts of the overvoltage protection device, namely the inductance and the capacitance, can then be inserted in this enlarged part of the casing.

The inductance may comprise a coil disposed axially with respect to the inner conductor of the high-voltage line and a ferromagnetic core may be disposed to surround the coil. The capacitance may comprise one or more capacitors disposed between the coil or the inner conductor and a casing section. Favorable conditions for the spatial arrangement and the insulation of the ferromagnetic core can then be achieved by providing the core as a ring and disposing it at ground potential on the inner circumference of the casing.

More specifically, an overvoltage protection device is provided according to the invention for a gas-insulated high-voltage line which includes an inner conductor enclosed by a metal casing, the overvoltage protection device comprising a low pass filter which includes an inductance electrically connected in series with the inner conductor of the high-voltage line and a capacitance electrically coupled in shunt with the inductance. The overvoltage protection device advantageously may be used in combination with an overvoltage arrester.

The capacitance is electrically coupled between the inductance and the casing of the high-voltage line. The metal casing section is connected to the metal casing of the high-voltage line and the low pass filter is disposed in the casing section. The inductance is connected to the inner conductor and the capacitance is connected between the inductance and the casing section.

The inductance is disclosed to comprise a coil disposed in the casing section axially with respect to the inner conductor of the high-voltage line and a ferromagnetic core is disposed about the coil. The capacitance is disclosed to comprise at least one capacitor disposed between the inner conductor and the casing section.

An electrically conductive support means for supporting the coil and for connecting the coil to the inner conductor is provided as an extension of the inner conductor, the support means being disposed on the axis of the inner conductor of the high-voltage line and being electrically connected at one end thereof to the inner conductor. A support ring is provided to connect the inner conductor and one end of the support means and for connecting and supporting the at least one capacitor.

The casing section includes flanges disposed at at least one end thereof for connection of the casing section with the casing of the high-voltage line or the overvoltage arrester. The casing section may comprise an end of the casing of the high-voltage line in which is disposed an extension of the inner conductor and which has an enlarged diameter. A flange is provided for connecting the enlarged section to the casing of additional high-voltage line or an overvoltage arrester.

The ferromagnetic core is disclosed to be a ring axially disposed about the coil and having an inside diameter corresponding to the diameter of the casing of the high-voltage line.

These and other aspects of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar part and in which.

DESCRIPTION OF THE PREFERRED EMBODIMENT

Figure 1:
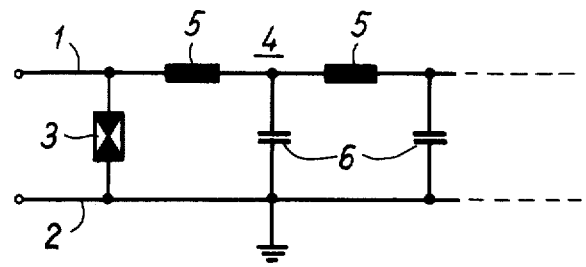
FIG. 1 is a circuit diagram of an overvoltage protection device according to the invention used in conjunction with an overvoltage arrester.

As shown in the circuit diagram of FIG. 1, a live inner conductor 1 is enclosed in a grounded metal casing 2 of a metal-encased and gas-insulated high-voltage line. An overvoltage or lightning arrester 3 is connected between the inner conductor 1 and the casing ground.

The overvoltage protection device 4 of the invention forms a low-pass filter which comprises inductances 5 and capacitances 6. The inductances 5 are connected in series with the inner conductor 1, while the capacitances 6 are connected in shunt between the series line of the inner conductor 1 and the inductances, and the casing ground.

Figure 2:
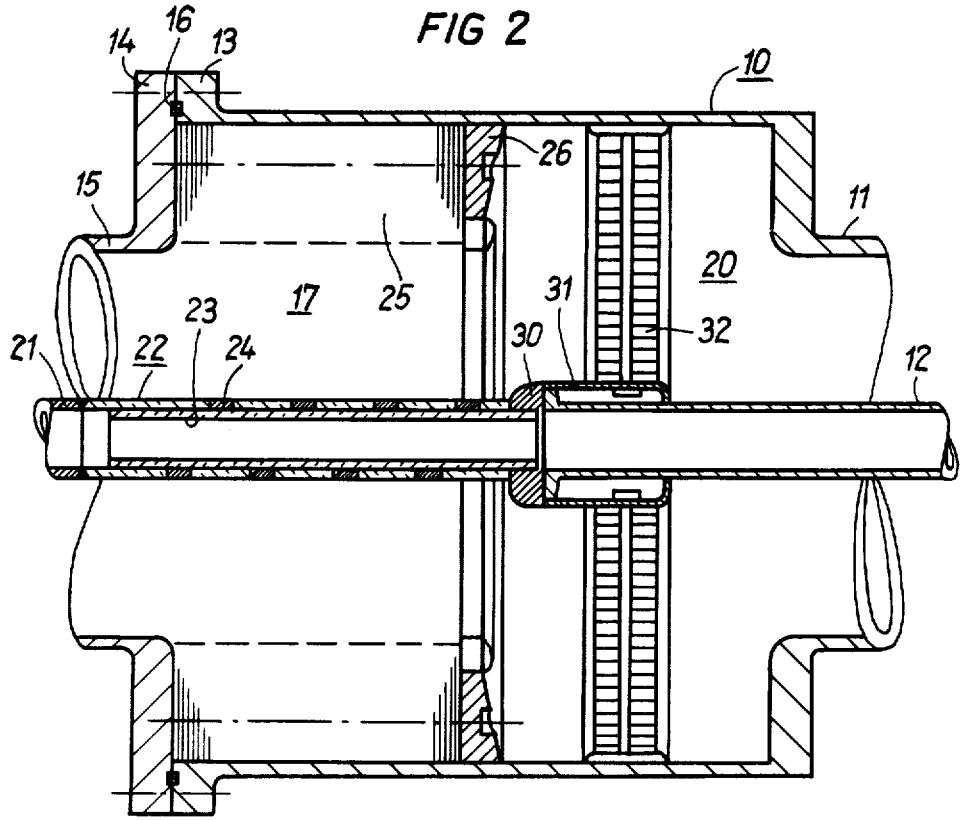
FIG. 2 is a longitudinal section view through an overvoltage protection device according to the invention.

An embodiment of the overvoltage protection device 4 of FIG. 1 is shown in section in FIG. 2. The overvoltage protection device 4 is housed in the end piece 10 of a casing section 11 of the high-voltage line. End piece 10 has an increased diameter and encloses a portion of the inner conductor 12 axially extending from section 11. A flange 13 is provided at one end of the end piece 10 for connecting the end piece to another casing section. A seal ring 16 is inserted between flange 13 and the adjacent flange 14 of another casing section 15.

In the interior of end section 10 are arranged axially side by side an inductance 17 and a capacitance 20. Inductance 17 comprises a coil axially arranged coaxially with respect to the inner conductor 21 of casing section 15 about an insulated support 23 and a conductor 24 applied thereon. To obtain sufficient shortcircuit protection, conductor 24 may be fastened on the support 23 by a wrap and a hardened plastic arrangement. Coil 22 is surrounded by a laminated iron core 25 whose inside diameter approximately corresponds to the inside diameter of the casing section 15. The iron core 25 can thus be insulated by the insulating gas contained in end piece 10 in the same manner as insulation is provided in casing 11. Alternatively, a ferrit ring may be used instead of the laminated iron ring 25. The sheet rings of the iron core 25 are braced relative to flange 14 by a pressure ring 26.

At its end toward capacitance 20, coil 22 is connected in alignment with the extended inner conductor 12 of the casing section 11. A ring 31 provided at the point of connection 30 serves to attach a capacitor arrangement comprising single ceramic capacitors or oil-filled capacitors 32. Several columns of capacitors 32 may be provided on the periphery of ring 31, depending on the required magnitude of the capacitance 20. At the same time these capacitors can provide for the support of the inner conductor 12 relative to the casing in conjunction with ring 31.

The overvoltage protection device of the invention may be provided as an independent unit in which a section corresponding to the end section 10 is provided with flanges at both ends thereof such that the device can be inserted between the adjacent casing sections of a high-voltage line or a section of high-voltage line and an overvoltage arrester.

What is claimed is:

1. An overvoltage protection device for a gas-insulated high-voltage line including an inner conductor enclosed by a metal casing, said device comprising a low pass filter which includes an inductance adapted to be electrically connected in series with the inner conductor of the high voltage line and a capacitance electrically coupled in shunt with said inductance, said capacitance adapted to be electrically coupled between said inductance and the casing of the high voltage line.

2. The device according to claim 1 and including a metal casing section adapted to be connected to the metal casing of the high voltage line, said low pass filter being disposed in said casing section, said capacitance being connected between said inductance and said casing section.

3. The device according to claim 2, wherein said casing section includes flanges disposed at at least one end thereof for connection of said casing section with one of the casing of the high-voltage line and an overvoltage arrester.

4. The device according to claim 2, wherein said casing section comprises an end of the casing of the high-voltage line, said end having an enlarged diameter and being provided with a flange for connecting said section to one of the casing of the additional high-voltage line and an overvoltage arrester.

5. The device according to claim 1, wherein said inductance comprises a coil disposed in said casing section axially with respect to the inner conductor of the high-voltage line and a ferromagnetic core disposed about said coil, said capacitance comprising at least one capacitor disposed between the inner conductor and said casing section.

6. The device according to claim 5, wherein said ferromagnetic core is a ring axially disposed about said coil and having an inside diameter corresponding to the diameter of the casing of the high-voltage line.

7. The device according to claim 5 and including electrically conductive support means for supporting said coil and connecting the coil to the inner conductor, said support means being disposed on the axis of the inner conductor of the high voltage line and being adapted to be electrically connected at one end thereof to the inner conductor.

8. The device according to claim 7 and including a support ring adapted to being connected to the inner conductor for connecting said one end of said support means thereto, said capacitor also being connected to said support ring.

9. Overvoltage protection apparatus for a gas-insulated high-voltage line including an inner conductor enclosed by a metal casing, said apparatus comprising in combination a low pass filter and an overvoltage arrester, said overvoltage arrester adapted to being coupled between the inner conductor of the high voltage line and ground potential, said low pass filter including an inductance being electrically connected to the overvoltage arrester and adapted to be electrically connected in series with the inner conductor of the high voltage line and a capacitance electrically coupled in shunt with said inductance, said capacitance adapted to be electrically coupled between said inductance and the casing of the high voltage line.

10. The apparatus according to claim 9 and including a metal casing section adapted to be connected to the metal casing of the high voltage line, said low pass filter being disposed in said casing section, said capacitance being connected between said casing section.

11. The apparatus according to claim 10, wherein said casing section includes flanges disposed at the ends thereof for connection of said casing section with the casing of the high-voltage line and the overvoltage arrester.

12. The apparatus according to claim 10, wherein said casing section comprises an end of the casing of the high-voltage line, said end having an enlarged diameter and being provided with a flange for connecting said section to the overvoltage arrester.

13. The apparatus according to claim 3, wherein said inductance comprises a coil disposed in said casing section axially with respect to the inner conductor of the high-voltage line and a ferromagnetic core disposed about said coil, said capacitance comprising at least one capacitor disposed between the inner conductor and said casing section.

14. The apparatus according to claim 13, wherein said ferromagnetic core is a ring axially disposed about said coil and having an inside diameter corresponding to the diameter of the casing of the high-voltage line.

15. The apparatus according to claim 13 and including electrically conductive support means for supporting said coil and connecting the coil to the inner conductor, said support means being disposed on the axis of the inner conductor of the high voltage line and being adapted to be electrically connected at one end thereof to the inner conductor.

16. The device according to claim 15 and including a support ring adapted to being connected to the inner conductor for connecting said one end of said support means thereto, said capacitor also being connected to said support ring.

* * * * *